(12) United States Patent
Parwani et al.

(10) Patent No.: US 11,855,833 B2
(45) Date of Patent: Dec. 26, 2023

(54) DEVICE-DRIVEN MANAGEMENT WORKFLOW STATUS AND IMPACT

(71) Applicant: VMWARE, INC., Palo Alto, CA (US)

(72) Inventors: Rahul Parwani, Atlanta, GA (US); Brian Link, Atlanta, GA (US); Satish Venkatakrishnan, Bangalore (IN); Mohan Guttikonda, Bangalore (IN); Amogh Datar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 4 days.

(21) Appl. No.: 17/225,216

(22) Filed: Apr. 8, 2021

(65) Prior Publication Data

US 2022/0239550 A1 Jul. 28, 2022

(30) Foreign Application Priority Data

Jan. 25, 2021 (IN) .............................. 202141003448

(51) Int. Cl.
*H04L 41/0631* (2022.01)
*H04L 9/40* (2022.01)
*H04L 41/22* (2022.01)
*H04L 41/12* (2022.01)

(52) U.S. Cl.
CPC ............ *H04L 41/065* (2013.01); *H04L 41/12* (2013.01); *H04L 41/22* (2013.01); *H04L 63/20* (2013.01)

(58) Field of Classification Search
CPC ....... H04L 41/065; H04L 41/12; H04L 41/22; H04L 63/20
See application file for complete search history.

(56) References Cited

U.S. PATENT DOCUMENTS

| | | |
|---|---|---|
| 7,392,162 B1 | 6/2008 | Srinivasan et al. |
| 9,904,585 B1 | 2/2018 | Islam et al. |
| 10,122,577 B1 | 11/2018 | Rykowski et al. |
| 10,324,783 B1 | 6/2019 | Saha et al. |
| 10,416,996 B1 | 9/2019 | Samprathi et al. |
| 10,469,304 B1* | 11/2019 | Kempe ................. H04L 41/085 |
| 10,636,005 B2* | 4/2020 | Kamath ........... G06Q 10/06316 |
| 10,673,712 B1 | 6/2020 | Gosar et al. |
| 10,719,336 B1 | 7/2020 | Tsybulnyk et al. |
| 11,082,302 B2* | 8/2021 | Mahajan ................ G06F 3/0486 |

(Continued)

OTHER PUBLICATIONS

Perez-Caparros, David, et al. "An architecture for creating and managing virtual networks." 2013 IEEE 24th Annual International Symposium on Personal, Indoor, and Mobile Radio Communications (PIMRC). IEEE (Year: 2013).*

(Continued)

*Primary Examiner* — John M Macilwinen
(74) *Attorney, Agent, or Firm* — Thomas | Horstemeyer, LLP (57) ABSTRACT

Examples of device-driven management are described. A management service can transmit a device-driven management workflow to a number of client devices. The device-driven management workflow can include workflow objects that define a branching sequence of instructions. The client devices can provide a corresponding plurality of completion statuses for a step of the device-driven management workflow. The management service can identify a failure of the step according to a set of failure rules, and visually emphasize the failure within a representation of the device-driven management workflow.

20 Claims, 6 Drawing Sheets

(56) References Cited

U.S. PATENT DOCUMENTS

| | | |
|---|---|---|
| 2002/0138321 A1 | 9/2002 | Yuan et al. |
| 2003/0009507 A1 | 1/2003 | Shum |
| 2005/0097536 A1* | 5/2005 | Bernstein .............. G06F 3/0481 |
| | | 717/157 |
| 2007/0203745 A1 | 8/2007 | Bartsch et al. |
| 2008/0040181 A1 | 2/2008 | Freire et al. |
| 2008/0097816 A1 | 4/2008 | Freire et al. |
| 2008/0120574 A1 | 5/2008 | Heredia et al. |
| 2008/0270597 A1 | 10/2008 | Tenenti |
| 2008/0271022 A1 | 10/2008 | Strassner et al. |
| 2009/0044185 A1 | 2/2009 | Krivopaltsev |
| 2010/0146396 A1 | 6/2010 | Able et al. |
| 2011/0161284 A1 | 6/2011 | Tewari et al. |
| 2012/0246122 A1 | 9/2012 | Short et al. |
| 2012/0304007 A1 | 11/2012 | Hanks et al. |
| 2013/0174047 A1 | 7/2013 | Sivakumar et al. |
| 2014/0013315 A1 | 1/2014 | Genevski et al. |
| 2014/0040840 A1 | 2/2014 | Hysong et al. |
| 2014/0164944 A1 | 6/2014 | Sivakumar et al. |
| 2014/0240745 A1 | 8/2014 | Boldt et al. |
| 2015/0149912 A1 | 5/2015 | Moore |
| 2015/0355935 A1* | 12/2015 | Ozaki ..................... G06F 9/46 |
| | | 718/100 |
| 2016/0179449 A1 | 6/2016 | Cho |
| 2016/0234073 A1 | 8/2016 | Maes |
| 2017/0161347 A1 | 6/2017 | Raza et al. |
| 2017/0288959 A1 | 10/2017 | Kelley et al. |
| 2017/0346683 A1 | 11/2017 | Li |
| 2017/0364843 A1* | 12/2017 | Haligowski ........ G06Q 10/0633 |
| 2017/0373932 A1* | 12/2017 | Subramanian ...... H04L 41/0895 |
| 2018/0048521 A1* | 2/2018 | Nair ....................... H04L 41/22 |
| 2018/0183762 A1 | 6/2018 | Fetvadjiev et al. |
| 2019/0101882 A1 | 4/2019 | Strinden et al. |
| 2019/0199597 A1 | 6/2019 | Valisammagari et al. |
| 2019/0312910 A1 | 10/2019 | Convertino et al. |
| 2019/0340049 A1 | 11/2019 | Saha et al. |
| 2019/0347168 A1 | 11/2019 | Giannetti |
| 2020/0074115 A1 | 3/2020 | Di Pietro et al. |
| 2020/0111041 A1 | 4/2020 | Levine et al. |
| 2020/0274773 A1* | 8/2020 | Mortsolf ................. H04L 43/08 |
| 2020/0344131 A1 | 10/2020 | Barton et al. |
| 2020/0379744 A1 | 12/2020 | Bhupati et al. |
| 2021/0092015 A1 | 3/2021 | Gardner et al. |
| 2021/0124610 A1 | 4/2021 | Gardner et al. |
| 2021/0149784 A1 | 5/2021 | Soorya et al. |
| 2021/0373942 A1 | 12/2021 | Lv et al. |
| 2022/0164181 A1 | 5/2022 | Reddy et al. |
| 2022/0229742 A1 | 7/2022 | Jain et al. |
| 2022/0231921 A1 | 7/2022 | Link et al. |
| 2022/0239550 A1 | 7/2022 | Parwani et al. |
| 2022/0239735 A1 | 7/2022 | Deriso et al. |

OTHER PUBLICATIONS

Wagner, Thomas, and Daniel Moldt. "Workflow management principles for interactions between petri net-based agents." International Conference on Applications and Theory of Petri Nets and Concurrency. Springer, Cham. (Year: 2015).*

Pla, Albert, et al. "Petri net-based process monitoring: a workflow management system for process modelling and monitoring." Journal of Intelligent Manufacturing 25.3: 539-554. (Year: 2014).*

* cited by examiner

Management Console 121

Workflow Title

Details — 303

Platform(s): All   Status: ○ Active   Total Devices: 2,000  |  Not Executing: 371  |  Success: 64%

Published By: Admin Name on 1/18/2021 at 3:21PM

[More]

Last modified on 12/21/2020 4:20PM

Overview — 306

View 351   Devices: (All) (Complete) (Failed) (In Prog.) (Pending)

Step 2 — 35% Failed
1629 Devices   14% In Progress   51% Completed

| | | |
|---|---|---|
| 1 | Entry Point: State Evaluation ~315 | |
| 2 | Check Application Exist? ~318 ⚠ | 403 |
| |   IF Application Exists ~321 | 406 |
| |   THEN Run Application ~324 | |
| |   ELSE IF Application Does Not Exist ~327 | |
| |   THEN (3) – [Check Device Platform/OS] | |
| 3 | > Check Device Platform/OS ~330 | 409 |

430

Recommendations
75% of Step 2 Failures are caused by a failure of the AppCheck Command on DeviceType2 Devices.

1. Replace Appcheck with AppCheckv2
   91% success rate across all DeviceTypes
2. Use Workflow 2
   83% success rate across all DeviceTypes
3. Modify Workflow to Check OS Before Appcheck
   75% of Successful App Install Workflows Check OS prior to ...

Devices — 309

| Last Seen | Device Type | User | Workflow Step | Workflow Status | Status Summary |
|---|---|---|---|---|---|
| 8m | DeviceType2 | UserID2 | 2 | Failed | AppCheck Fail |
| 12m | DeviceType2 | UserID3 | 2 | Failed | AppCheck Fail |
| 7m | DeviceType1 | UserID8 | 2(A) | Failed | Run Fail |
| 10m | DeviceType2 | UserID15 | 2 | Failed | AppCheck Fail |

FIG. 4

Management Console 121

Workflow Title

Workflow Information 303

Platform(s): All     Status: ○ Active     Total Devices | Not Executing | Success
                                          2,000 | 371 | 64%

Published By: Admin Name on 1/18/2021 at 3:21PM

[More]

Last modified on 12/21/2020 4:20PM

Impact Summary 306

View  351    Devices: (All) (Complete) (Failed) (In Prog.) (Pending)

500

Step 2  35% Failed
1629 Devices   14% In Progress   51% Completed

| Completed | Failed | In Progress | Pending |
|---|---|---|---|
| 831 | 571 | 227 | 0 |

Step Summary

Check Application Exist 318 ⚠
IF Application Exists
THEN Run Application
ELSE IF Application Does Not Exist
THEN (3) – [Check Device Platform/OS]

Step 1 — 503
Step 2 — 506
Step 3 — 509

0  250  500  750  1k  1.25k  1.5k  1.75k  2k

Legend: Completed, Failed, In Progress, Pending

Devices 309

| Last Seen | Device Type | User | Workflow Step | Workflow Status | Status Summary |
|---|---|---|---|---|---|
| 11m | DeviceType1 | UserID1 | 3 | Complete | -- |
| 8m | DeviceType2 | UserID2 | 2 | Failed | AppCheck Fail |
| 12m | DeviceType2 | UserID3 | 2 | Failed | AppCheck Fail |
| 27m | DeviceType1 | UserID4 | 3 | Pending | Unkwn Pend Check-in |
| ... | | | | | |

FIG. 5

DEVICE-DRIVEN MANAGEMENT WORKFLOW STATUS AND IMPACT

RELATED APPLICATIONS

Benefit is claimed under 35 U.S.C. 119(a)-(d) to Foreign Application Serial No. 202141003448 filed in India entitled "DEVICE-DRIVEN MANAGEMENT WORKFLOW STATUS AND IMPACT", on Jan. 25, 2021, by VMware, Inc., which is herein incorporated in its entirety by reference for all purposes.

BACKGROUND

Various challenges can arise in the management of enterprise resources using a management service. Access to the capabilities of a device can be managed through the administration of compliance rules defined and enforced by the management service. The proliferation of personal tablet and smartphone devices, for example, has resulted in several companies and organizations allowing employees to use their own devices for enterprise purposes. The use of these personal devices can be associated with productivity gains and cost savings. The concept "bring your own device" (BYOD) for access to enterprise computing systems may have met initial resistance due to security concerns, but more and more companies are now looking to incorporate BYOD policies. This causes enterprises to manage a growing number of different desktop, tablet, and mobile devices, along with various platforms and operating systems available for adoption by users. Many enterprises include employees that work in various locations including a traditional workplace, temporary field workplaces, as well as from home. At the same time, complexity of processes utilized for protecting enterprise resources has increased, requiring higher bandwidth for the constant communication of managed devices with the management service. Personal devices can frequently lose network connectivity, causing security issues, management failures, and delays. There is a need for a more efficient and effective device management paradigm.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to providing the status and impact of client-device-driven management workflows. Many enterprises allow employees to work in various locations including traditional workplaces, temporary or field workplaces, as well as from home. At the same time, complexity of processes utilized for protecting enterprise resources has increased, requiring higher bandwidth for the constant communication of managed devices with a management service. Personal devices can frequently lose network connectivity, causing security issues, management failures, and delays. However, the present disclosure describes mechanisms that solve these issues using tools for status and impact of client-device-driven management workflows.

Figure 1:
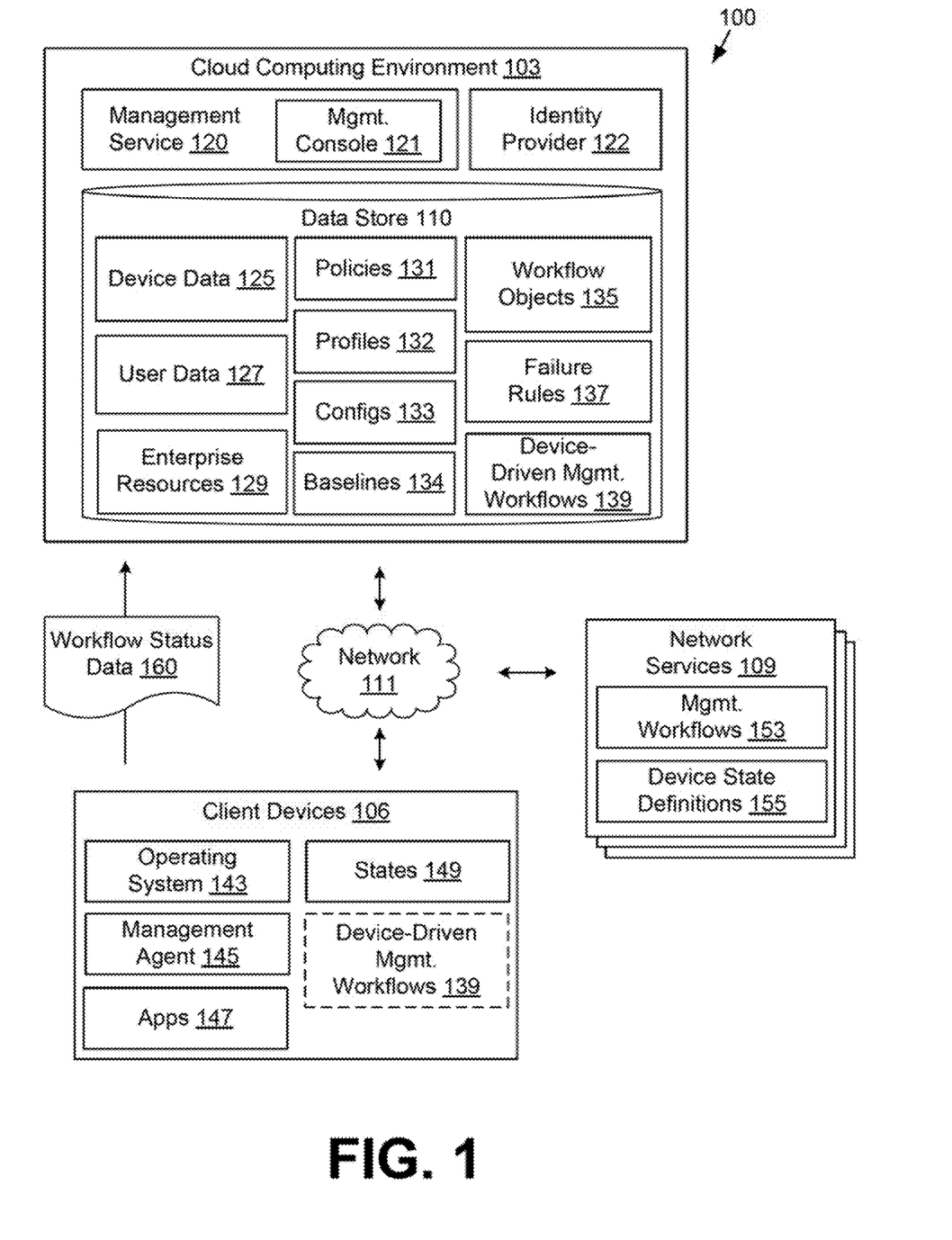
FIG. 1 illustrates an example networked environment that provides workflow status and impact, according to various examples described herein.

FIG. 1 illustrates an example networked environment 100 for generation of client-device-driven management workflows according to various examples described herein. The networked environment 100 includes a computing environment 103, several client devices 106, and a network service 109 in communication using a network 111.

The computing environment 103 can be embodied as one or more computers, computing devices, or computing systems. In certain embodiments, the computing environment 103 can include one or more computing devices arranged, for example, in one or more server or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources varies over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 includes a data store 110. The computing environment 103 can also execute a management service 120. The management service 120 can generate a management console 121 that includes a user interface through which an administrator or other user can manage client devices 106 that are enrolled with the management service 120. The administrator can access the management console 121 using a client device 106. An identity provider 122 can be hosted using the computing environment 103 or can be used as a network service 109 in conjunction with the management service 120.

The data store 110 includes areas in memory for the storage of device data 125, user data 127, enterprise resources 129, policies 131, profiles 132, configurations 133, baselines 134, and other compliance rules. The data store 110 can also include workflow objects 135, comprehensiveness definitions, failure definitions 137, and device-driven management workflows 139, among other types of data. The management service 120 can operate as a UEM platform that can manage client devices 106 that are enrolled as managed devices with the management service 120. The management service 120 and the management console 121 can be accessible over a public wide area network (WAN) such as the Internet.

Device data 125 can represent information about client devices 106 that are enrolled as managed devices with the management service 120. The device data 125 can include a device identifier, certificates associated with the client device 106, a user identifier identifying the user account with which the device is linked, authentication tokens provided by the identity provider 122 to the client device 106, configuration profiles and compliance policies 131 assigned to the client device 106, and other information regarding management of the client device 106 as an enrolled device. The device data 125 can also include a last-known compliance status associated with a managed client device 106. The compliance status can identify which compliance rules the client device 106 or a user account linked to the client device 106 has violated. For example, the client device 106 may have been taken outside of a specified geofence defined for the client device 106. The device data 125 can also indicate a device type and a platform of the client device 106. The device type can include desktop-type device, mobile-type device, tablet-type device, and the like. Device type can also refer to a device model or serial number. The platform of the client device 106 can be an indication of an operating system 143 such as Windows® 10, macOS®, iOS®, Android®, as well as other versions of the operating system 143.

User data 127 represents information about users who have user accounts with the management service 120 or an enterprise that uses the management service 120. These users can also have one or more client devices 106 that are enrolled as managed devices with the management service 120. User data 127 can include authentication data, and information about network services with which the user is assigned an account. The user data 127 can include a user account associates a user identifier and one or more device identifiers for client devices 106.

The management service 120 can enroll several client devices 106 for mobile device management services. To begin enrollment, the management service 120 can identify and authenticate one of the client devices 106 and store data related to the client device 106 in the device data 125 for later reference. In some cases, the management service 120 (or a management agent 145, an application 147, or another component executing on the client device 106) can also be registered as a device administrator (at least in part) of the client device 106, permitting the management service 120 to configure and manage certain operating aspects of the client device 106.

Once a client device 106 is enrolled for device management by the management service 120, the management service 120 can provide device-driven management workflows 139 for implementation on the client device 106. The device-driven management workflows 139 can enforce policies 131, profiles 132, configurations 133, security baselines 134, and other compliance rules. The device-driven management workflows 139 can also deploy enterprise resources 129 such as applications 147, data resources, and access to network services 109 that are federated with the identity provider 122.

The management service 120 can also maintain individual and group command queues for the client device 106. A client device 106 can periodically check in and retrieve commands from the command queue. The management service 120 can also transmit a check-in notification to the client device 106 that includes instructions to check in. The check-in notification can be transmitted using a push notification service or another notification service, and the client device 106 can check in based on the notification. The management service 120 can provide the device-driven management workflows 139 by placing, in a command queue for the client device 106, a command to execute the device-driven management workflow 139. The client device 106 can check in, retrieve the command, and download the device-driven management workflow 139 from a location specified by the command. Once received, the device-driven management workflow 139 can be implemented by the client device 106 without checking in with the command queue, including in scenarios where the client device 106 lacks a connection with the network 111 or otherwise lacks access to the command queue.

The management service 120 can also include, in the command queue, a command to provide states 149, completion statuses, and other workflow status data 160 associated with execution of the device-driven management workflow 139. The client device 106 can maintain a log of states 149, completion statuses, and other workflow status data 160 regarding execution of the device-driven management workflow 139. The client device 106 can check in, retrieve the command to provide status data, and transmit the states 149, completion statuses, and other specified information from the log. In other examples, the management agent 145 can transmit the workflow status data 160 to the management service 120 periodically, on a schedule, and at specified points in the device-driven management workflows 139. The management service 120 can identify success or failure of a portion of the device-driven management workflow 139 based on the states 149 and other information received.

Workflow objects 135 can include a set of graphical tools that can be used in the management console 121 to form and edit device-driven management workflows 139. Each workflow object 135 can include instructions formatted using a particular syntax. Since the workflow objects 135 can be used to form the device-driven management workflows 139, each device-driven management workflows 139 can also use the syntax of the workflow objects 135. Installation type workflow objects 135 can include instructions that specifies a parameter that indicates to install payloads, policies 131, profiles 132, configurations 133, baselines 134, and other enterprise resources 129. Evaluation type workflow objects 135 can include instructions that specifies a parameter that indicates to evaluate device states 149, policies 131, profiles 132, configurations 133, baselines 134, and device state definitions 155 such as evaluation of device-specific risk levels for a client device 106 based on its states 149. Entry point type workflow objects 135 can workflow objects 135 can specify a parameter that indicates a set of client devices 106, for example, according to user group, device type, platform, other device data 125, and other user data 127.

The workflow objects 135 can also include connector workflow objects 135 between other workflow objects 135. Connector workflow objects 135 can specify conditions and states 149 under which a branch corresponding to that connector is to be implemented. Connector workflow objects 135 can extend from a conditional workflow object 135. Conditional workflow objects 135 can include if, while, for, AND, OR, NAND, NOR, and other conditions. The states 149 for respective branch connectors from an if-conditional workflow object 135 can be mutually exclusive from states 149 for other branch connectors. Alternatively, the states 149 for branch connectors from an if-conditional workflow object 135 can be evaluated in an order specified by the if-conditional workflow object 135.

Comprehensiveness definitions can identify a set of device states 149 or device conditions that a device-driven management workflow 139 can include in order to be considered comprehensive. In some cases, a comprehensiveness definition can be generated for a particular enterprise based on the known device data 125 and user data 127 for the enterprise. In other cases, a comprehensiveness definition can be generated for a particular user group or another logical grouping of client devices 106 using a filtered subset of the device data 125 and user data 127 for that logical grouping of client devices 106.

Failure rules 137 can include a set of algorithms and threshold values that can be used by the management service 120 to identify when a device-driven workflow failure is to be emphasized or painted in the management console 121. The failure be identified based on workflow status data 160 received from client devices 106 that are executing a particular device-driven management workflow 139. The workflow status data 160 can be received as workflow status messages transmitted by client devices 106. The management service 120 can provide the workflow status data 160 for multiple client devices 106 as an input to a machine learning algorithm specified by the failure rules 137, and the machine-learning algorithm can output an indication of whether the workflow status data 160 is to be emphasized or painted in the management console 121.

Workflow status data 160 received from a client device 106 can indicate a position in the device-driven management workflow 139, and a set of states 149. The position can indicate a at least one step that the client device 106 has attempted, as well as a completion status for the step. The workflow status data 160 can also indicate a device-state-specific branch of the step that is performed by the client device 106. As a result, workflow status data 160 provides an indication of the device-state-specific branch(es) taken by the client device 106 through the branching sequence of instructions of the device-driven management workflow 139. Each step can include an evaluation workflow object 135, and a set of device-state-specific branches that extend from the evaluation workflow object 135. Each device-state-specific branch can include connector workflow objects 135 to one or more non-evaluation workflow object 135.

The management service 120 can also compare the workflow status data 160 to threshold values. If parameters specified in the workflow status data 160 meet or exceed the threshold values, the management service 120 can emphasize or paint a specified failure in the management console 121. The failure can be specified for a particular step corresponding to a workflow object 135 in the device-driven management workflow 139. Example threshold values can include a threshold percentage of client devices 106 indicating a failure at a particular step, of client devices 106 indicating a failure at a particular step. The percentage can indicate a percentage of a total number of client devices 106 that have attempted the particular step. The failure can refer to failure to complete steps corresponding to any of the workflow objects 135 discussed.

Failure rules 137 can also include rules that can identify a reason for the failure. The management console 121 can generate a user interface that indicates the reason. For example, the failure rules 137 can provide rules to identify whether a state 149, or a set of states 149 can be correlated as a cause of the failure. The management service 120 can determine that a threshold percentage of the failures are experienced by client devices 106 that include a particular state 149 or set of states 149. The management service 120 can provide the workflow status data 160 for the failed step as an input to a machine learning algorithm that correlates the failure to a state 149 or a set of states 149 for client devices 106 that experienced the failure. The management console 121 can generate a user interface that includes the states 149 or the set of states 149.

The management service 120 can use the failure rules 137 to identify a corrective measure such as a replacement workflow object 135, a replacement device-driven management workflow 139, or a modification to the device-driven management workflow 139. The management service 120 can determine that the failure is associated with a particular type of workflow device-driven management workflow 139, a particular type of workflow object 135, and/or a specified parameter or state 149. The management service 120 can use thresholds and machine learning algorithms to identify a corrective measure that is associated with one or more of the type of device-driven management workflow 139, type of workflow object 135, and the parameter or state 149. The failure rules 137 can identify corrective measure that exhibit a threshold success rate associated with the type of device-driven management workflow 139, type of workflow object 135, and the parameter or state 149. The management console 121 can generate a user interface element that includes the corrective measure. The management console 121 can generate a user interface element that automatically updates the device-driven management workflow 139 based on the identified corrective measure.

States 149 can include a platform or operating system 143 of the client device 106; a sensor value or range of sensor values detected by a sensor of the client device 106; whether an application 147 is installed on the client device 106; whether a script has been executed on the client device 106, whether a file is stored on the client device 106; a total, used, or available amount of storage, memory, compute, or network bandwidth for the client device 106; a network address or IP address of the client device 106; a geolocation or physical location of the client device 106; and a device model or device type of the client device 106.

The management service 120 can analyze the device data 125 and the user data 127 for a particular logical grouping of client devices 106 and generate a comprehensiveness definition that includes a superset of conditions including platforms, states 149, user groups, networks, geolocations, and applications 147 for the logical grouping of client devices 106. The management service 120 can identify a logical grouping of client devices 106 relevant to a device-driven management workflow 139.

Comprehensiveness definition can be static or dynamic. For example, a user can access the management console 121 and begin designing a device-driven management workflow 139. The management service 120 can analyze the workflow objects 135 of the device driven workflow 139 and determine that the device-driven management workflow 139 is limited to a particular user group, a particular operating system, or both. The management service 120 can identify a logical grouping of client devices 106 based on the current limitations of the device-driven management workflow 139. The management service 120 can generate a dynamic workflow-specific comprehensiveness definition that includes a superset of conditions including platforms, states 149, user groups, networks, geolocations, and applications 147 limited to the workflow-specific logical grouping of client devices 106. The management console 121 can provide recommendations for the device-driven management workflow 139 based on the workflow-specific comprehensiveness definition.

In another example, the user can select a static comprehensiveness definition that includes conditions including platforms, states 149, user groups, networks, geolocations, and applications 147 for comprehensive coverage of client device 106. Even if the device-driven workflow 139 is currently limited to devices that do not correspond to the static comprehensiveness definition, the management console 121 can provide recommendations for the device-driven management workflow 139 based on the broader set of conditions of the static comprehensiveness definition. Recommendations can identify locations such as workflow objects 135 and branching locations where a condition can be added to the device-driven management workflow 139. The comprehensiveness definitions can be used by the management console 121 to provide recommendations for device conditions, states 149, applications 147, and enterprise resources 129 to include in a particular device-driven management workflow 139.

Unlike traditional management workflows that are directed by the management service 120, the device-driven management workflows 139 enable an end user's client device 106 to direct deployment operations to install policies 131, profiles 132, configurations 133, security baselines 134, and other compliance rules, as well as applications 147, certificates, and other enterprise resources 129. To this end, device-driven management workflows 139 can include a branching sequence of instructions that branches based on states 149 that are evaluated on the end user's client device 106. States 149 can be evaluated by a management agent 145 based on instructions in the device-driven management workflows 139 once delivered. As a result, the path that is ultimately executed for a single device-driven management workflow 139 can be different for different client devices 106 that include different states 149.

States 149 can include conditions on the client device 106 such as platform of the client device 106, a type of the client device 106, a geolocation of the client device 106, a public or private network to which the client device 106 is communicatively connected, a user group associated with the client device 106, applications 147 that are installed on the client device 106, settings of the client device 106, and other device conditions.

The management service 120 can also provide a management console 121 as an engine and console interface for device management of the client devices 106. An information technology administrator or user, for example, can view, administer, and update client-device driven management workflows 139 using the management console 121. The client-device driven management workflows 139 can be deployed or transmitted to a set of the client devices 106 to install and enforce policies 131, profiles 132, configurations 133, security baselines 134, and other compliance rules. The client-device driven management workflows 139 can also install applications 147, and other components that enable access to network services 109 and enterprise resources 129. The compliance rules can be collectively administered for several of the client devices 106 by organizing the client devices 106 into several different groups or categories of devices according to organizational, platform, and other factors.

The management console 121 can include a workflow creation user interface area. The workflow creation user interface area can include a drag-and-drop canvas user interface area that shows the workflow objects 135 of a device-driven management workflow 139 in a workflow view; a programming language user interface area that shows the workflow objects 135 of a device-driven management workflow 139 in text instructions or code form; or a list or tree view that shows the workflow objects 135 of a device-driven management workflow 139.

The identity provider 122 can provide single sign-on or identity management capabilities for access to enterprise resources 129 through the management service 120 as well as network services 109. The identity provider 122 can allow users to authenticate his or her identity to obtain an authentication token that can be provided to a network service 109. The identity provider 122 can utilize OAuth, security assertion mark-up language (SAML), or other single sign-on methodologies. The identity provider 122 and management service 120 can communicate so that the management service 120 can revoke or authorize access to various services for users in the enterprise based on status of a client device 106 assigned to the user. The identity provider 122 can also rely on user data 127 in the data store 110. In some examples, the identity provider 122 can rely upon a separate source of user data in a separate data store.

The network service 109 can be embodied as one or more computers, computing devices, or computing systems. Like the computing environment 103, the network service 109 can include one or more computing devices arranged, for example, in one or more server or computer banks. The computing device or devices can be located at a single installation site or distributed among different geographical locations. The network service 109 can include a plurality of computing devices that together embody a hosted computing resource, a grid computing resource, or other distributed computing arrangement. The network service 109 can also be embodied, in part, as certain functional or logical (e.g., computer-readable instruction) elements or modules as described herein. The network service 109 can be provided by an enterprise to its users and can include first- and third-party network services 109 with respect to the management service 120. For example, a network service 109 can include an optional service from a provider of the management service 120 or can be a third-party network service 109. The management workflows 153 and the device state definitions 155 from a third-party network service 109 can be referred to as third-party management workflows 153 and third-party device state definitions 155. The network service 109 can federate its authentication for users of the enterprise to the identity provider 122. The network service 109 can be accessible over the Internet or another public WAN.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the management service 120 for device management. A management agent 145 can be installed on a client device 106 to locally manage the device using device-driven management workflows 139 that are provided by the management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

The management agent 145 can also have the authority to enable or disable certain hardware features of the client device 106 that are specified for a particular branch of a device-driven management workflow 139. The management agent 145 can also place the device into different hardware modes, such as airplane mode, silent mode, do-not-disturb mode, or other modes supported by the client device 106.

The management agent 145 can perform device-driven management workflows 139 to alter operation of the client device 106 in response to changes in states 149 that are detected on the client device 106. The management agent 145, in one instance, can periodically poll the operating system 143, a data store, or other software and hardware components of the client device 106 to identify states 149 that are indicated in a device-driven management workflow 139.

The device-driven management workflow status data 160 can indicate a most recent step corresponding to a workflow object 135 that is performed; a completion status such as completed, failed, in progress, or pending; and a set of states 149 of the client device 149. The management agent 145 can transmit workflow status data 160 periodically, on a schedule, and at specified points of execution of a device-driven management workflows 139. The workflow status data 160 can include a set of states 149 from the client device 106, and can include or be used to generate a client device event log for each step of a device-driven management workflow 139. The device-driven management workflows 139 can specify the set of states 149 to include along with the workflow status data 160, or the management agent 145 can use another predetermined set of states 149.

The event log can indicate a number of events such as workflow step retries, completions, and failures; workflow retries, completions, and failures; device sensor readings and requests; operating system information and statuses; security information and statuses; BIOS verification statuses, and other events. The event log can include a table or data structure that identifies a severity, a time, a device identifier, a user, a source, a module, a category, and other information for each event. The module can refer to an executable component or application on the client device 106. The source can specify the device 106, a network service 109, or another source. The management console 121 can generate a user interface element that shows a visual representation of the event log table or data structure.

The device-driven management workflows 139 can include appropriate commands in response to certain states 149. Commands can include generating a notification on the client device 106, sending a notification to an administrator, sending a notification and other compliance data to the management service 120, changing a non-compliant state 149 to a compliant state 149, deleting applications 147 and other enterprise resources, ending a SSO session with the identity provider, removing access to enterprise resources, and other management actions on the client device 106. In one example, the management agent 145 can detect that the client device 106 is out of compliance with respect to a compliance rule indicated in device-driven management workflows 139 and might instruct the management agent 145 to restrict a hardware feature of the client device 106, delete data from the client device 106, or disable certain applications on the client device 106. The management agent 145 can also take other variations of management actions on the client device 106 as directed by the device-driven management workflows 139.

As part of the enrollment process, the management service 120 and/or management agent 145 can be registered as a device administrator of the client device 106, permitting the management service 120 and/or management agent 145 to manage certain operating aspects of the client device 106. In either case, the management service 120 can remotely configure the client device 106 by interacting with the management agent 145. The device-driven management workflows 139 can also indicate various applications 147 and software components to install on the client device 106. Such software components can include, for example, applications, resources, libraries, drivers, device configurations, or other related components. The device-driven management workflows 139 can also indicate network locations where the software components can be downloaded for installation. The device-driven management workflows 139 can also indicate to download and install compliance rules and instruct the management agent 145 and the operating system 143 of the client device 106 to enforce the compliance rules.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the computing environment 103, the network service 109, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The management workflows 153 can include enterprise management workflows 153 for an enterprise employing the management service 120. The device state definitions 155 can include device state definitions 155 and enterprise device state definitions 155. The network services 109 can include previous or legacy management services, community network sites where management workflows 153 and device state definitions 155 can be publicly posted and accessed, private servers to which an enterprise has access, and other services.

The management service 120 can include network service integrations that enable the management service 120 to identify and retrieve first- and third-party resources including the management workflows 153 and device state definitions 155. The management service 120 can display these resources in the management console 121. The management service 120 can also allow management workflows 153 and device state definitions 155 to be imported and translated into device-driven management workflows 139. A device state definition 155 can be reformatted using a particular syntax to form a new or modified workflow object 135, or a device-driven management workflow 139 capable of assessing the device state definitions 155 on a client device 106. A management workflow 153 can be retrieved and reformatted into a device-driven management workflow 139 that is expressed using a set of workflow objects 135.

Figure 2A:
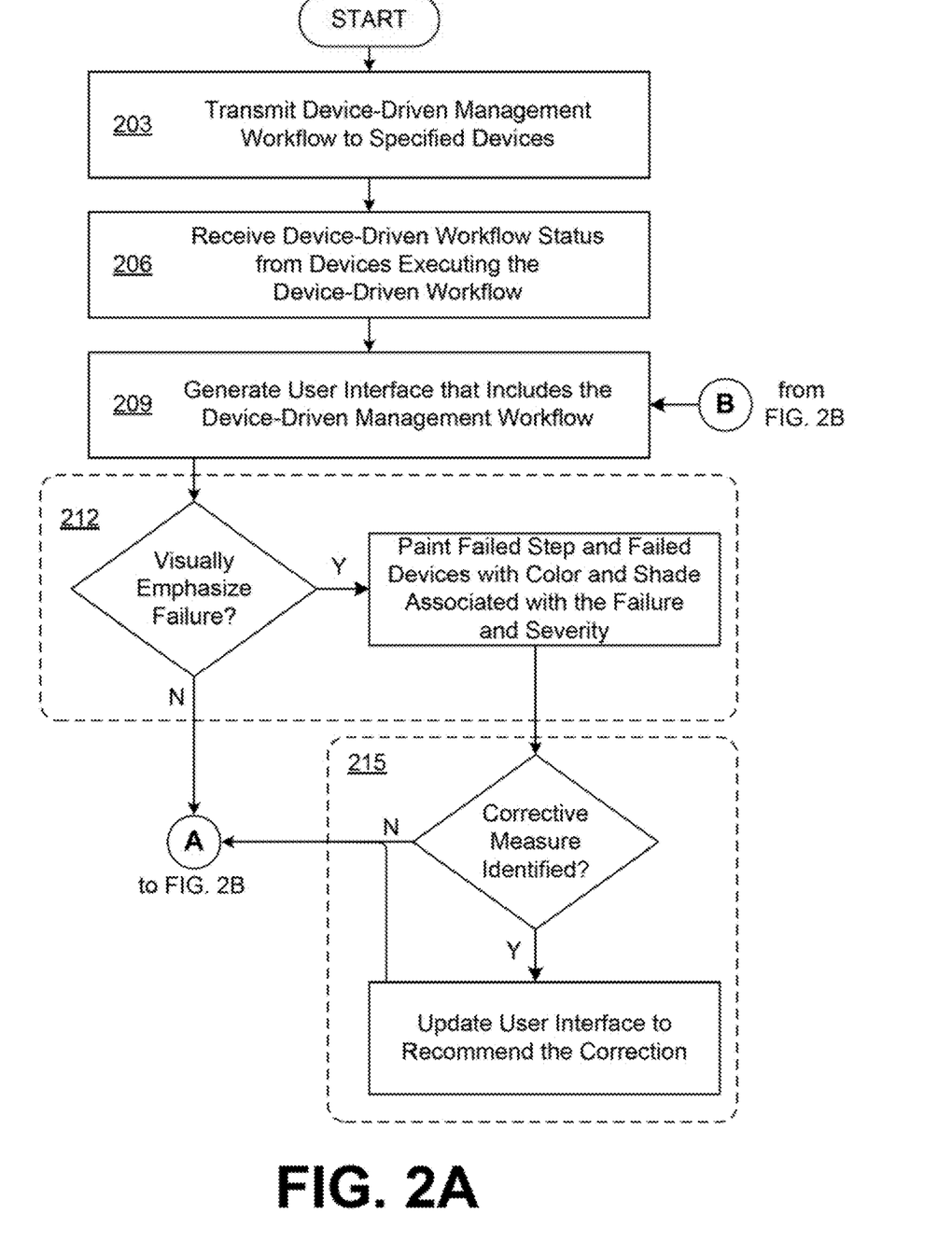
FIG. 2A illustrates a flowchart performed by components of the networked environment for workflow status and impact, according to various examples described herein.

FIG. 2A shows a flowchart performed by components of the networked environment 100. Specifically, the flowchart describes how the management service 120 provides device-driven management workflow status and impact. This includes a management console 121 that can efficiently and intuitively guide corrections to device-driven management workflows 139. Actions performed by the management service 120 can also be performed by the management console 121. Some functionalities discussed can also be performed by other components of the networked environment 100. Segmentation and ordering indicated in the flowchart is for example purposes only. The functionality described for a particular step can be performed in any order relative to the other steps described.

At step 203, the management service 120 can publish or transmit a device-driven management workflow 139 to client devices 106. The management console 121 can transmit the device-driven management workflow 139 to a set of client devices 106 specified through the management console 121, or specified in the device-driven management workflow 139. The client devices 109 can then perform the device-driven management workflow 139.

The management service 120 can provide the device-driven management workflows 139 by placing, in a command queue for the client device 106, a command to execute the device-driven management workflow 139. The client device 106 can check in, retrieve the command, and download the device-driven management workflow 139 from a location specified by the command. Once received, the device-driven management workflow 139 can be implemented by the client device 106. The client device 106 can maintain a log of states 149, completion statuses, and other workflow status data 160 regarding execution of the device-driven management workflow 139.

At step 206, the management service 120 can receive device-driven management workflow status data 160 from client devices 106. Each of the client devices 106 can perform the device-driven management workflow 139 and provide workflow status data 160 from client devices 106 as updates. The management service 120 can also include, in the command queue, a command to provide states 149, completion statuses, and other workflow status data 160 associated with execution of the device-driven management workflow 139. The client device 106 can check in, retrieve the command to provide status data, and transmit the states 149, completion statuses, and other specified information from the log.

In other examples, the management agent 145 can transmit the workflow status data 160 to the management service 120 periodically, on a schedule, and at specified points in the device-driven management workflows 139. The management service 120 can identify success or failure of a portion of the device-driven management workflow 139 based on the states 149 and other information received. The device-driven management workflow status data 160 can indicate a most recent step corresponding to a workflow object 135 that is performed; a completion status such as completed, failed, in progress, or pending; and a set of states 149 of the client device 106.

At step 209, the management service 120 can generate a user interface that includes the device-driven management workflow 139 that is transmitted to the client devices 106 for execution. The user interface can include a workflow information area, an impact information area, and a device information area.

The management service 120 can generate the workflow information area to show device platforms affected by the device-driven management workflow 139; an activation status (e.g., active/inactive, or published/unpublished); a user identifier of an admin that published or activated the device-driven management workflow 139; a date the device-driven management workflow 139 was last modified; a total number of client devices 106 that the device-driven management workflow 139 specified in the set of client devices 106; a number of client devices 106 that are confirmed to be executing the device-driven management workflow 139; a number of client devices 106 that are not executing, or are not confirmed to be executing, the device-driven management workflow 139; and a success rate or rate of successful completion of, or non-failed continued execution of, the device-driven management workflow 139.

The management service 120 can generate the impact information area to show a selected view of the device-driven management workflow 139 along with live status or impact information generated using workflow status data 160 received from the set of client devices 106. An overview graph view type can show, for each step of the device-driven management workflow 139, a bar graph, line graph, or another type of graph that shows a number of client devices 106 that have completed each step, failed each step, are in progress for each step, and/or are pending for each step.

The management console 121 can enable a user to edit the device-driven management workflow 139 and transmit an updated device-driven management workflow 139 to all client devices 106 or a subset of the client devices 106 associated with a failure. The impact information area can include a user interface element 336 that updates the user interface to show information for one or more of: all client devices 106; client devices 106 associated with a completed status for a selected step or workflow object 135; client devices 106 associated with a failed status for a selected step or workflow object 135; client devices 106 associated with an in-progress status for a selected step or workflow object 135; and client devices 106 associated with a pending status for a selected step or workflow object 135. If a subset of client devices 106 is selected, corresponding portions of the graph for each step can be updated to hide information for the unselected steps. Multiple elements can be selected concurrently. For example, completed and failed client devices 106 can be concurrently selected and shown, failed and in progress client devices 106 can be concurrently selected and shown, and so on.

The management service 120 can generate the device information area to show all or the selected subset of client devices 106. For example, the device information area can include a table or list of client devices 106. The table can show, for each client device 106, a device identifier, a device type, a user identifier, a workflow step that was last reported, a status of the step, and a status summary that includes a textual description of the failure or other status summary.

At step 212, the management service 120 can determine whether a failure should be visually emphasized in the user interface. While some level of failure can be tolerated as acceptable in view of the variety of client devices 106, others can be emphasized and brought to the attention of administrators for review and correction. The management service 120 can visually emphasize workflow objects 135 or corresponding steps in the impact information area according to the failure rules 137. If a failure is to be visually emphasized, the management service can paint a failed workflow objects 135 or step with a border, background, or fill of a particular color, monochrome shade, or shade of a color; hatching or another type of pattern; an icon; bolded or thickened lines; a line type, and so on. The management service 120 can also visually emphasize rows in the device information area, corresponding to client devices 106 that have failed a workflow or step in view of the failure rules 137. For example, the row can be emphasized to indicate failure and severity of the failure the using one or more of a border, background, or fill of a particular color, monochrome shade, or shade of a color; hatching or another type of pattern; an icon; bolded or thickened lines; a line type, and so on. Otherwise, the process can move to connector A that connects to FIG. 2B.

At step 215, the management service 120 can determine whether a corrective measure has been identified, for example, for the emphasized failure. The management service 120 can use the failure rules 137 to identify a corrective measure such as a replacement workflow object 135, a replacement device-driven management workflow 139, or a modification to the device-driven management workflow 139. The management service 120 can determine that the visually emphasized failure is associated with a particular type of workflow device-driven management workflow 139, a particular type of workflow object 135, and/or a specified parameter or state 149. The management service 120 can use thresholds and machine learning algorithms to identify a corrective measure that is associated with one or more of the type of device-driven management workflow 139, type of workflow object 135, and the parameter or state 149. The failure rules 137 can identify corrective measure that exhibit a threshold success rate associated with the type of device-driven management workflow 139, type of workflow object 135, and the parameter or state 149. The management console 121 can generate a user interface element that includes the corrective measure. The management console 121 can generate a user interface element that automatically updates the device-driven management workflow 139 based on the identified corrective measure. Otherwise, the process can move to connector A that connects to FIG. 2B.

Figure 2B:
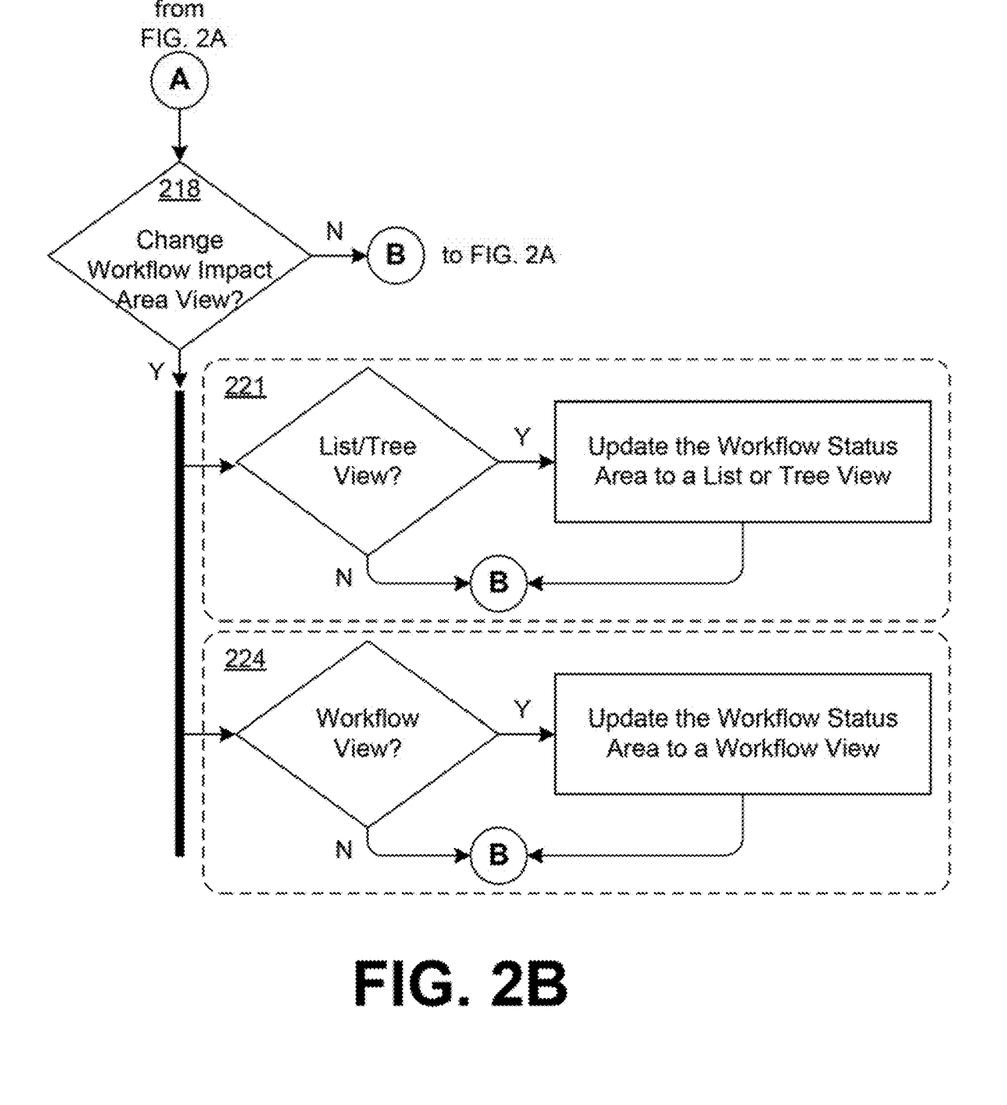
FIG. 2B illustrates another flowchart performed by components of the networked environment for workflow status and impact, according to various examples described herein.

FIG. 2B shows another flowchart performed by components of the networked environment 100. This flowchart continues from the flowchart of FIG. 2A, and further describes how the management service 120 and management console 121 provides device-driven management workflow status and impact.

In step 218, the management console 121 can determine whether to change the view or format of the workflow impact information area. For example, the management console 121 can detect a user manipulation of an interface type selector. If the interface type selector is manipulated, then the process can move to step 221 or step 224. Otherwise, the process can move to step B, which connects to FIG. 2A.

Figure 4:
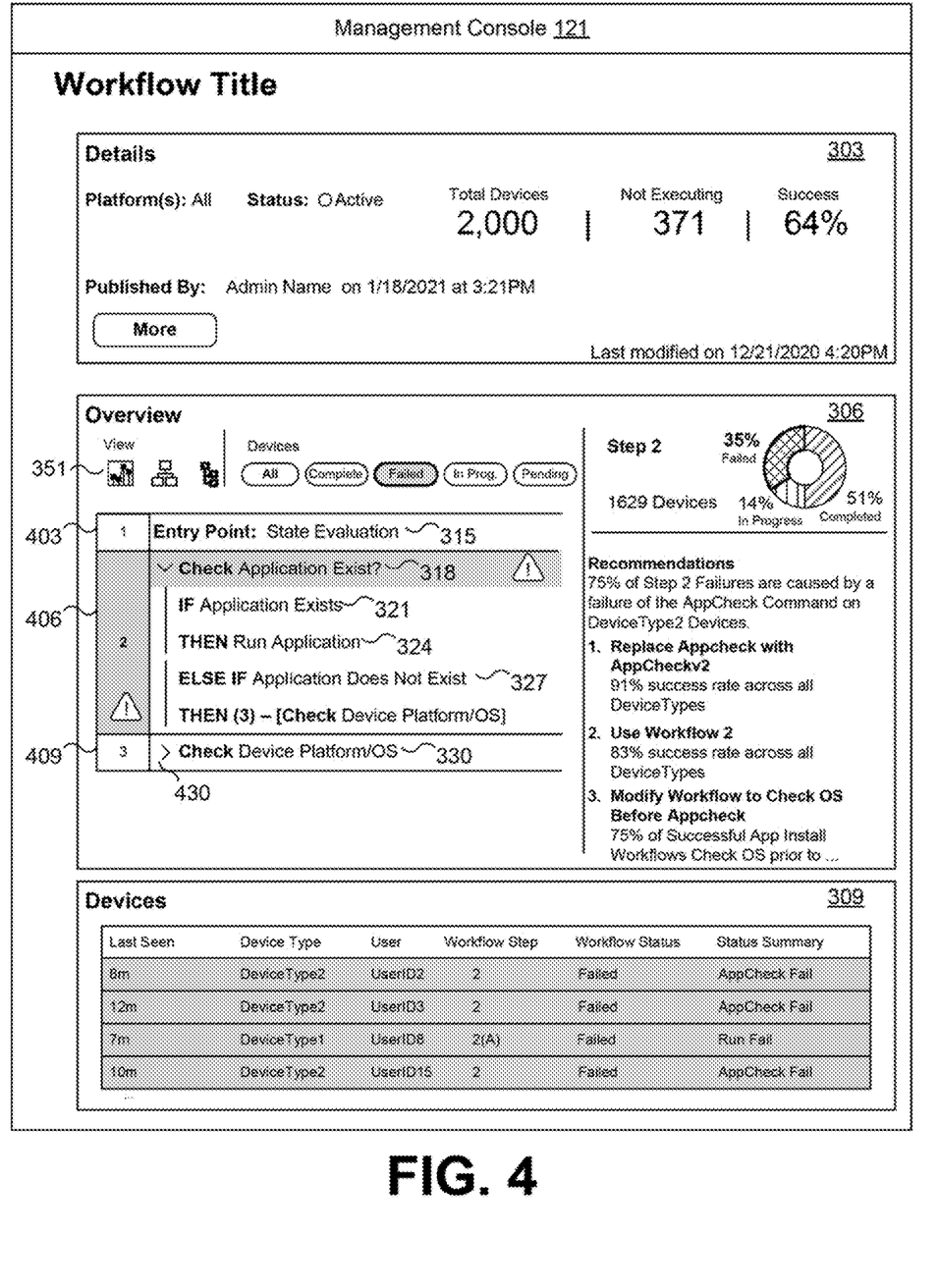
FIG. 4 illustrates another example user interface that provides workflow status and impact using components of the networked environment, according to various examples described herein.

In step 221, the management service 120 can determine whether a list or tree view has been selected by the user manipulation of the interface type selector. If the tree view has been selected, then the management service 120 can update the workflow impact information area accordingly. A tree view can show the workflow objects 135 of the device-driven management workflow 139 reformatted into an expandable tree of hierarchical steps or list objects as shown in FIG. 4. The process can then move to step B, which connects to FIG. 2A.

In step 224, the management service 120 can determine whether a workflow view has been selected by the user manipulation of the interface type selector. If the workflow view has been selected, then the management service 120 can update the workflow impact information area to include a workflow view. The workflow view can show the device-driven management workflow 139 in a graphical workflow view that includes icon-type or other graphical representations of workflow objects 135 connected to one another using line-type connector workflow objects 135. A code view can also be selected to update the workflow impact information area. The process can then move to step B, which connects to FIG. 2A.

Figure 3:
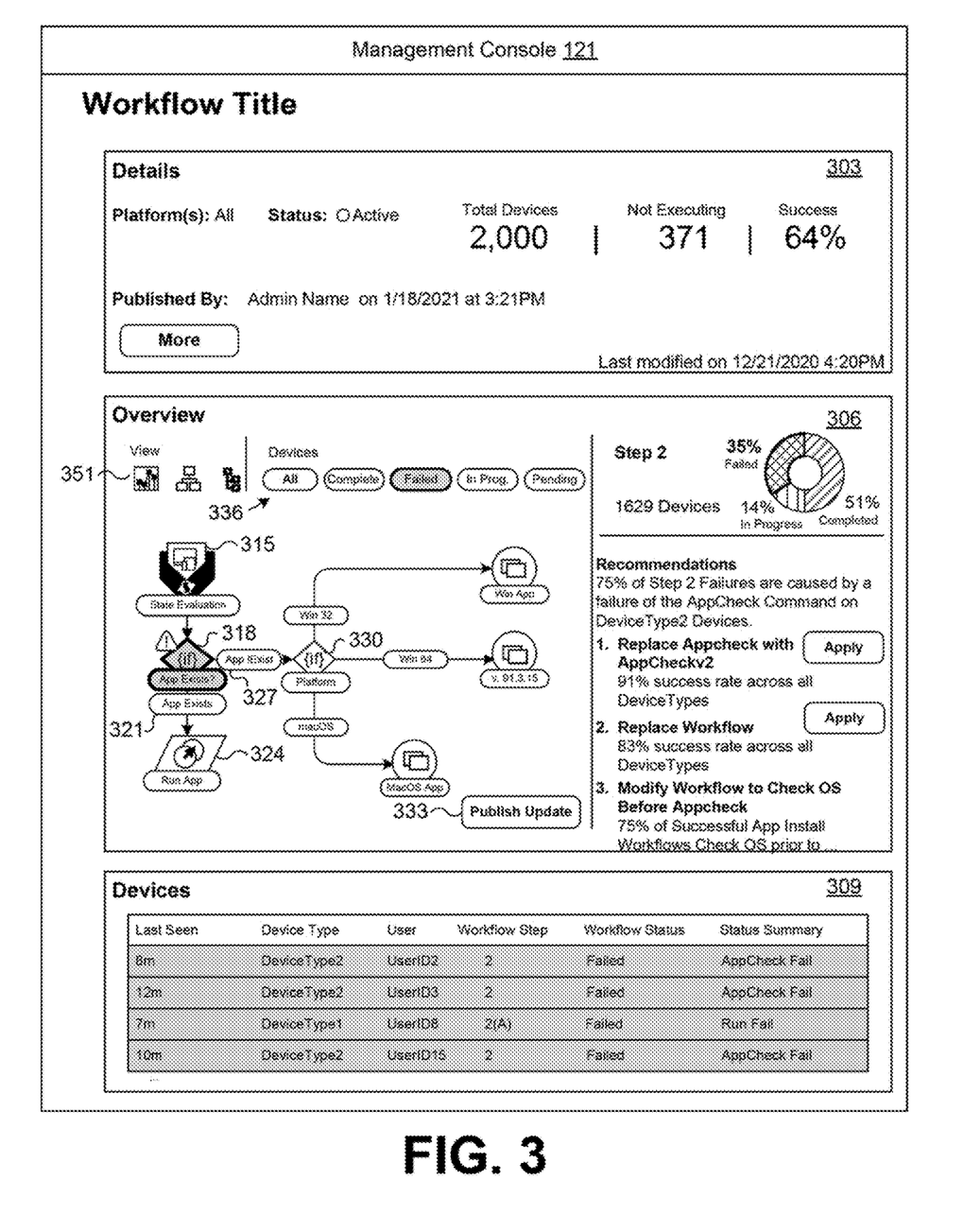
FIG. 3 illustrates an example user interface that provides workflow status and impact using components of the networked environment, according to various examples described herein.

FIG. 3 shows an example user interface of the management console 121. The user interface can include tools for device-driven management. The management console 121 can be include a component of the management service 120. The management console 121 can be generated using the management service 120.

The management console 121 can include a workflow information area 303, an impact information area 306, and a device information area 306. The workflow information area 303 can specify device platforms affected by the device-driven management workflow 139; an activation status (e.g., active/inactive, or published/unpublished); a user identifier of an admin that published or activated the device-driven management workflow 139; a date the device-driven management workflow 139 was last modified; a total number of client devices 106 that the device-driven management workflow 139 specified in the set of client devices 106; a number of client devices 106 that are confirmed to be executing the device-driven management workflow 139; a number of client devices 106 that are not executing, or are not confirmed to be executing, the device-driven management workflow 139; and a success rate or rate of successful completion of, or non-failed continued execution of, the device-driven management workflow 139.

The impact information area 306 can include a selected view of the device-driven management workflow 139. In this case, the view can include a workflow view of the device-driven management workflow 139. The workflow view can be locked or un-editable, but in other cases can include an editable drag-and-drop canvas user interface that shows the workflow objects 135 of the device-driven management workflow 139 in a graphical workflow view that includes icon-type or other graphical representations of workflow objects 135 connected to one another using line-type connector workflow objects 135.

The impact information area 306 can include workflow objects 135, including the workflow objects 315-330 among others. A nested entry point workflow object 315 can be connected to an if-evaluation workflow object 318 using a connector workflow object. The nested entry point workflow object 315 can indicate that the device-driven management workflow 139 is performed as a nested workflow that starts with a state evaluation of one or more states 149. The nested entry point workflow object 315 can also indicate that the device-driven management workflow 139 is designed to be performed periodically on a client device 106 to evaluate the specified states 149 and execute an appropriate branch of instructions through the device-driven management workflow 139.

The if-evaluation workflow object 318 can include a number of branches to execute based on the states 149 of the client device 106. In some cases, the if-evaluation workflow object 318 can include an icon overlay or label that specifies a state 149 that is evaluated based on the if-evaluation workflow object 318. Here, the if-evaluation workflow object 318 can evaluate whether an application 147 exists on the client device 106 at the time of evaluation.

One branch of instructions from the if-evaluation workflow object 318 can include a connector workflow object 321 and a command workflow object 324. The connector workflow object 321 can include a "App Exists" evaluation status indicator. This evaluation status indicator indicates that the branch of instructions through the connector workflow object 321 is performed in conditions where the application 147 exists on the client device 106. The command workflow object 324 can include instructions for the management agent 145 to run the application 147.

A second branch of instructions from the if-evaluation workflow object 318 can include a connector workflow object 327 and another if-evaluation workflow object 330. The connector workflow object 327 can include a "App !Exist" evaluation status, indicating that the branch of instructions through the connector workflow object 327 is performed in conditions where the client device 106 lacks the application 147.

The if-evaluation workflow object 330 can specify a state 149 that is evaluated based on the if-evaluation workflow object 330. Here, the if-evaluation workflow object 330 can evaluate a platform or operating system 143 of the client device 106. The if-evaluation workflow object 330 can include a number of branches to execute based on the states 149 of the client device 106. Each branch includes a corresponding connector workflow object 135 that specifies a platform, and an application install workflow object that specifies a platform-specific version of the application to install.

The impact information area 306 can include live status and impact information generated using workflow status data 160 received from the set of client devices 106 that are executing the device-driven management workflow 139. For example, the management service 120 can determine that the if-evaluation workflow object 318 is associated with a threshold level of failure across the deployment to client devices 106. The management service 120 can visually emphasize the if-evaluation workflow object 318. The if-evaluation workflow object 318 can be painted with a border, background, or fill of a particular color, monochrome shade, or shade of a color, hatching or another type of pattern; an icon; bolded or thickened lines; a line type, and so on. In some cases the color or the shade of the color can be matched to a particular severity level of the failure. For example, red can indicate failure, and dark red can indicate a more severe failure than a light red.

The impact information area 306 can include a recommendations section that provides recommendations that include manual and automatic corrective measures. For example, the recommendations can specify to replace the application checking if-evaluation workflow object 318 with another if-evaluation workflow object 135 that also includes parameters that specify an application check. The management service 120 can identify a success rate associated with the recommended if-evaluation workflow object 135 and provide this information textually. The recommendations can include a recommendation to replace or update the device-driven management workflow 139 with an alternative device-driven management workflow 139 that installs the same application for all platforms. The management service 120 can identify a success rate associated with the alternative device-driven management workflow 139 and provide this information textually. The recommendations can specify textual instructions for how to manually modify the device-driven management workflow 139, along with a success rate. The management console 121 can enable a user to manually edit or automatically correct the device-driven management workflow 139. For example, some recommendations can include user interface elements that automatically apply the recommendation when selected.

The management console 121 can also include a user interface element 333 that when selected, transmits an updated device-driven management workflow 139 to all client devices 106, or a subset of the client devices 106 associated with a failure. The management service 120 can also visually emphasize rows in the device information area 309, corresponding to client devices 106 that have failed a workflow or step in view of the failure rules 137.

The management console 121 can include a user interface element 336 that updates the user interface to show information for one or more of: all client devices 106; client devices 106 associated with a completed status for a selected step or workflow object 135; client devices 106 associated with a failed status for a selected step or workflow object 135; client devices 106 associated with an in-progress status for a selected step or workflow object 135; and client devices 106 associated with a pending status for a selected step or workflow object 135.

The device information area 309 can show all or the selected subset of client devices 106. For example, the device information area can include a table or list of client devices 106. The table can show, for each client device 106, a device identifier, a device type, a user identifier, a workflow step that was last reported, a status of the step, and a status summary that includes a textual description of the failure or other status summary. A selection of a particular client device 106 from the device information area 309 can cause the user interface to be updated to show a device log for the selected client device 106. The device log can show a number of events for the failed step or the failed workflow object 318.

The management console 121 can also include an interface type selector 351. The interface type selector 351 can enable a user to change a type of representation of the device-driven workflow that is provided. For example, the representation can be switched to a code view that shows a programming language area that shows the workflow objects 135 of a device-driven management workflow 139 as text instructions or code; a list or tree view that shows the workflow objects 135 of a device-driven management workflow 139 reformatted as a set of hierarchical list objects, where evaluation list objects are expandable to show textual representations for device-evaluated states 149; and a workflow overview that shows a status graph indicative of progress of the client devices 106 through steps that correspond to list objects.

FIG. 4 shows another example user interface of the management console 121 for device-driven management workflow status and impact. In this example, the view shown in the impact information area 306 includes a list or tree view. A user can select the list view using the interface type selector 351. The list view can show the workflow objects 135 of the device-driven management workflow 139 reformatted into a list of steps corresponding to list objects 403, 406, and 409.

List object 403 can include a reformatted version of the nested entry point workflow object 315. List object 406 can include reformatted versions of the workflow objects 318-327. List object 409 can include reformatted versions of the workflow object 330, and all non-evaluation workflow objects that stem from that evaluation workflow object 330. Generally, a step or list object can include an evaluation workflow object 135, all non-evaluation workflow objects 135 that stem from that evaluation workflow object 135, as well as a name or identification of any additional evaluation objects that stem from the evaluation workflow object 135. The list object 409 can also include a user interface element 430 that expands the list object 409 to show the reformatted version of the if-evaluation workflow object 330, along with the non-evaluation workflow objects that stem from the if-evaluation workflow object 518.

The failed if-evaluation workflow object 318 can be painted with a border, background, or fill of a particular color, monochrome shade, or shade of a color; hatching or another type of pattern; an icon; bolded or thickened lines; a line type, and so on. In some cases the color or the shade of the color can be matched to a particular severity level of the failure. For example, red can indicate failure, and dark red can indicate a more severe failure than a light red. In the list view, step "2" corresponding to list object 406 can be emphasized when the list object is collapsed into a single line or row. However, when expanded the failed workflow object 318 can be visually emphasized while other workflow objects are un-emphasized. The step indicator of list object 406 can also be visually emphasized in the expanded form.

Figure 5:
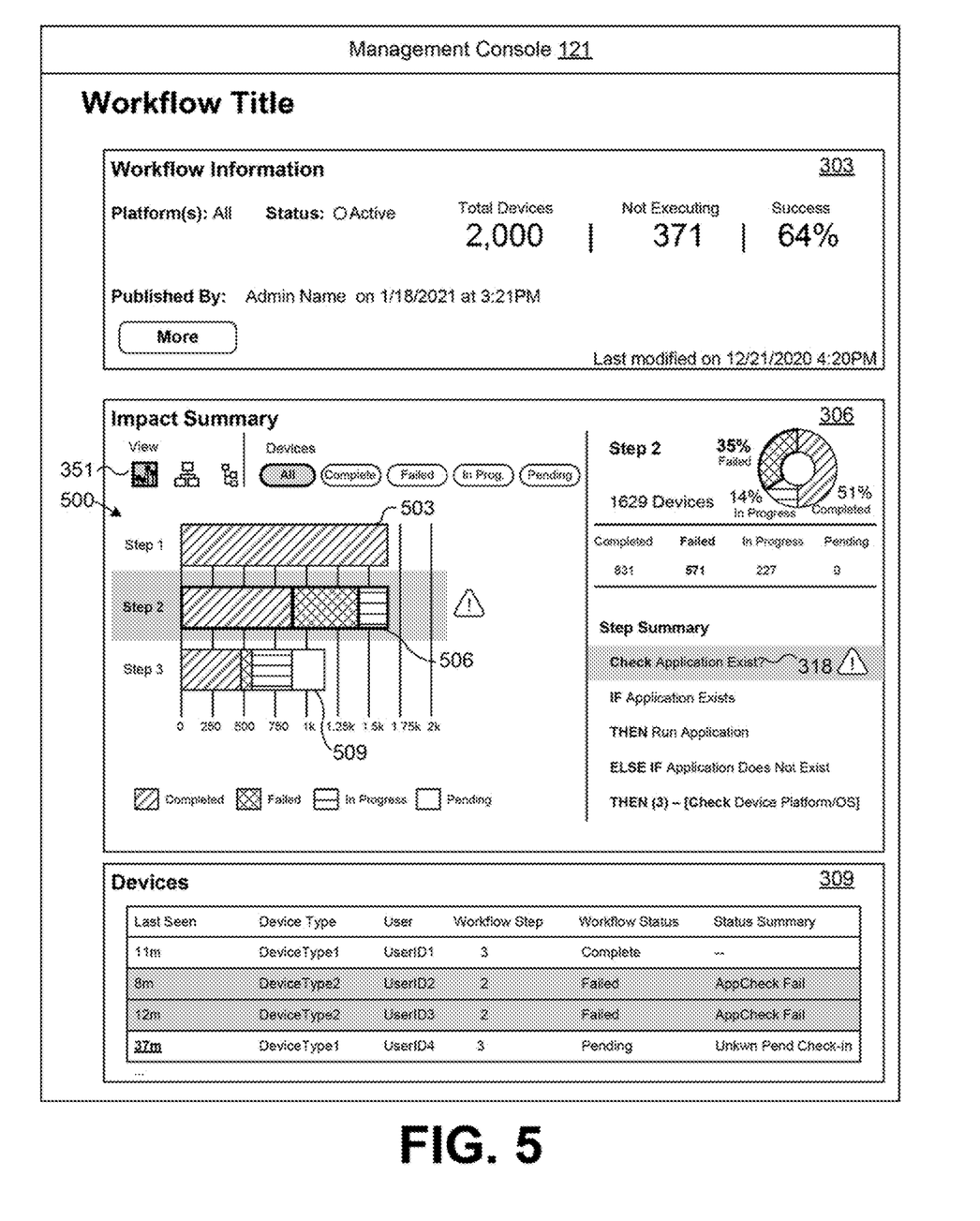
FIG. 5 illustrates another example user interface that provides workflow status and impact using components of the networked environment, according to various examples described herein.

FIG. 5 shows another example user interface of the management console 121 for device-driven management workflow status and impact. In this example, the view shown in the impact information area 306 includes a step overview. A user can select the step overview format using the interface type selector 351. The impact information area 306 can be updated to include an overview graph 500.

The overview graph 500 can indicate, for each step corresponding to list objects 403, 406, and 409, completion status information for client devices 106 reporting data for that step. The overview graph 500 can include progress bars 503, 506, and 509, corresponding to the list objects 403, 406, and 409. A total length of each of the progress bars 503, 506, and 509 can indicate the total number of client devices 106 reporting data for the workflow objects 135 of the corresponding step or list object. For example, management service 120 can identify that the number of devices reporting data is 1629 out of 2000 the total client devices 106 specified for the device-driven management workflow 139.

The progress bar 503 can have a length that indicates 1629 client devices 106 have reported data for step 1. The progress bar 503 can also include a color, shade of a color, pattern, colored pattern, or other visual feature that indicates that these 1629 devices have completed step 1. Progress bar 506 can also have a length that indicates all 1629 client devices 106 have reported data for step 2. Progress bar 506 can also include a first section or sub-bar that indicates a number of the client devices 106 that have completed step 2, a second section that indicates a number of the client devices 106 that report failure to complete step 2, and a third section a number of client devices 106 that report step 2 is in progress. Each portion or sub-bar can include a corresponding color, shade of a color, pattern, colored pattern, or other visual feature associated with the reported completion status. Progress bar 509 can have a total length that indicates a total number of client devices 106 that have reported data for step 3 and sections that indicate a number of the client devices 106 reporting each of a number of completion statuses. A visual key can identify the association between each visual feature and the reported completion status.

The progress bar 506 for failed "step 2" can be painted with a border, background, or fill of a particular color, monochrome shade, or shade of a color; hatching or another type of pattern; an icon; bolded or thickened lines; a line type, and so on. In some cases, a side bar can provide a step summary corresponding to the workflow objects 135 for step 2. The failed workflow object 318 can be visually emphasized to provide greater detail than the overall failure indicated by visually emphasizing progress bar 506.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

What is claimed is:

1. A method, comprising:
   transmitting, by a management service, a device-driven management workflow to a plurality of client devices, wherein the device-driven management workflow comprises a plurality of workflow objects that define a branching sequence of instructions that branches according to at least one conditional workflow object that provides a branching point that causes a respective client device to evaluate a device condition to select a device-specific path through the branching sequence of instructions;
   receiving, by the management service from the plurality of client devices, workflow status data comprising a plurality of completion statuses for a step of the device-driven management workflow, the step comprising at least one workflow object including a conditional workflow object;
   generating, by the management service, a user interface comprising: a device information area that includes a listing of the plurality of client devices as a list or a table, and a workflow area that includes a representation of the device-driven management workflow comprising a representation of the conditional workflow object;
   identifying, by the management service, a failure of the conditional workflow object of the step based on an analysis of the plurality of completion statuses according to a set of failure rules;
   updating, by the management service, the device information area to visually emphasize a subset of the client devices that experience the failure of the conditional workflow object, wherein a respective client device that experiences the failure is listed in association with a device type identifier, a user identifier, and a status that indicates the failure of the conditional workflow object;
   updating, by the management service, at least one of a border, background, or fill of the representation of the conditional workflow object in the user interface to visually emphasize the failure within the representation of the device-driven management workflow; and
   generating, by the management service, the user interface to show a recommendation to correct the failure, the recommendation comprising: a corrective measure to correct the failure, and a user interface element that when selected replaces or modifies at least a portion of the device-driven management workflow to correct the failure.

2. The method of claim 1, wherein the respective client device performs the device-specific path through the branching sequence of instructions based on at least one client-device-evaluated state that is specified by the device condition of the respective client device.

3. The method of claim 1, wherein the workflow status data provides an indication of at least one device-state-specific branch taken by the respective client device through the branching sequence of instructions of the device-driven management workflow.

4. The method of claim 1, wherein the failure is correlated with a failed workflow object of the at least one workflow object of the step, and the user interface is updated to visually emphasize the failed workflow object in order to visually emphasize the failure.

5. The method of claim 1, further comprising:
   generating, by the management service, the user interface to include a list of the plurality of client devices;
   identifying, by the management service, a subset of the plurality of client devices that are associated with a failed completion status; and
   visually emphasizing the subset of the plurality of client devices that are associated with the failed completion status.

6. The method of claim 1, further comprising:
   identifying, by the management service, at least one corrective measure to correct the step of the device-driven management workflow.

7. The method of claim 6, further comprising:
   modifying, by the management service, the device-driven management workflow based on the corrective measure.

8. A non-transitory computer-readable medium embodying instructions executable by at least one computing device, the instructions, when executed, causing the at least one computing device to at least:
   transmit, by a management service, a device-driven management workflow to a plurality of client devices, wherein the device-driven management workflow comprises a plurality of workflow objects that define a branching sequence of instructions that branches according to at least one conditional workflow object that provides a branching point that causes a respective client device to evaluate a device condition to select a device-specific path through the branching sequence of instructions;

receive, by the management service from the plurality of client devices, workflow status data comprising a plurality of completion statuses for a step of the device-driven management workflow, the step comprising at least one workflow object including a conditional workflow object;

generate, by the management service, a user interface comprising: a device information area that includes a listing of the plurality of client devices as a list or a table, and a workflow area that includes a representation of the device-driven management workflow comprising a representation of the conditional workflow object;

identify, by the management service, a failure of the conditional workflow object of the step based on an analysis of the plurality of completion statuses according to a set of failure rules;

update, by the management service, the device information area to visually emphasize a subset of the client devices that experience the failure of the conditional workflow object, wherein a respective client device that experiences the failure is listed in association with a device type identifier, a user identifier, and a status that indicates the failure of the conditional workflow object;

update, by the management service, at least one of a border, background, or fill of the representation of the conditional workflow object in the user interface to visually emphasize the failure within the representation of the device-driven management workflow; and generate, by the management service, the user interface to include: a corrective measure to correct the failure, and a user interface element that when selected replaces or modifies at least a portion of the device-driven management workflow to correct the failure.

9. The non-transitory computer-readable medium of claim 8, wherein the respective client device performs the device-specific path through the branching sequence of instructions based on at least one client-device-evaluated state that is specified by the device condition of the respective client device.

10. The non-transitory computer-readable medium of claim 8, wherein the workflow status data provides an indication of at least one device-state-specific branch taken by the respective client device through the branching sequence of instructions of the device-driven management workflow.

11. The non-transitory computer-readable medium of claim 8, wherein the failure is correlated with a failed workflow object of the at least one workflow object of the step, and the user interface is updated to visually emphasize the failed workflow object in order to visually emphasize the failure.

12. The non-transitory computer-readable medium of claim 8, wherein the instructions, when executed, cause the at least one computing device to at least:
generate, by the management service, the user interface to include a list of the plurality of client devices;
identify, by the management service, a subset of the plurality of client devices that are associated with a failed completion status; and
visually emphasize, by the management service, the subset of the plurality of client devices that are associated with the failed completion status.

13. The non-transitory computer-readable medium of claim 8, wherein the instructions, when executed, cause the at least one computing device to at least:
identify, by the management service, at least one corrective measure to correct the step of the device-driven management workflow.

14. The non-transitory computer-readable medium of claim 13, wherein the instructions, when executed, cause the at least one computing device to at least:
modify, by the management service, the device-driven management workflow based on the corrective measure.

15. A system, comprising:
at least one computing device; and
instructions accessible by the at least one computing device, wherein the instructions are executed causing the at least one computing device to at least:
transmit, by a management service, a device-driven management workflow to a plurality of client devices, wherein the device-driven management workflow comprises a plurality of workflow objects that define a branching sequence of instructions that branches according to at least one conditional workflow object that provides a branching point that causes a respective client device to evaluate a device condition to select a device-specific path through the branching sequence of instructions;

receive, by the management service from the plurality of client devices, workflow status data comprising a plurality of completion statuses for a step of the device-driven management workflow, the step comprising at least one workflow object including a conditional workflow object;

generate, by the management service, a user interface comprising: a device information area that includes a listing of the plurality of client devices as a list or a table, and a workflow area that includes a representation of the device-driven management workflow comprising a representation of the conditional workflow object;

identify, by the management service, a failure of the conditional workflow object of the step based on an analysis of the plurality of completion statuses according to a set of failure rules;

update, by the management service, the device information area to visually emphasize a subset of the client devices that experience the failure of the conditional workflow object, wherein a respective client device that experiences the failure is listed in association with a device type identifier, a user identifier, and a status that indicates the failure of the conditional workflow object;

update, by the management service, at least one of a border, background, or fill of the representation of the conditional workflow object in the user interface to visually emphasize the failure within the representation of the device-driven management workflow; and generate, by the management service, the user interface to include a user interface element that when selected replaces or modifies at least a portion of the device-driven management workflow to correct the failure.

16. The system of claim 15, wherein the respective client device performs the device-specific path through the branching sequence of instructions based on at least one clientdevice-evaluated state that is specified by the device condition of the respective client device.

17. The system of claim 15, wherein the workflow status data provides an indication of at least one device-state-specific branch taken by the respective client device through the branching sequence of instructions of the device-driven management workflow.

18. The system of claim 15, wherein the failure is correlated with a failed workflow object of the at least one workflow object of the step, and the user interface is updated to visually emphasize the failed workflow object in order to visually emphasize the failure.

19. The system of claim 15, wherein the instructions, when executed, cause the at least one computing device to at least:
   generate, by the management service, the user interface to include a list of the plurality of client devices;
   identify, by the management service, a subset of the plurality of client devices that are associated with a failed completion status; and
   visually emphasize, by the management service, the subset of the plurality of client devices that are associated with the failed completion status.

20. The system of claim 15, wherein the instructions, when executed, cause the at least one computing device to at least:
   identify, by the management service, at least one corrective measure to correct the step of the device-driven management workflow.

\* \* \* \* \*